Figures 1, 3:
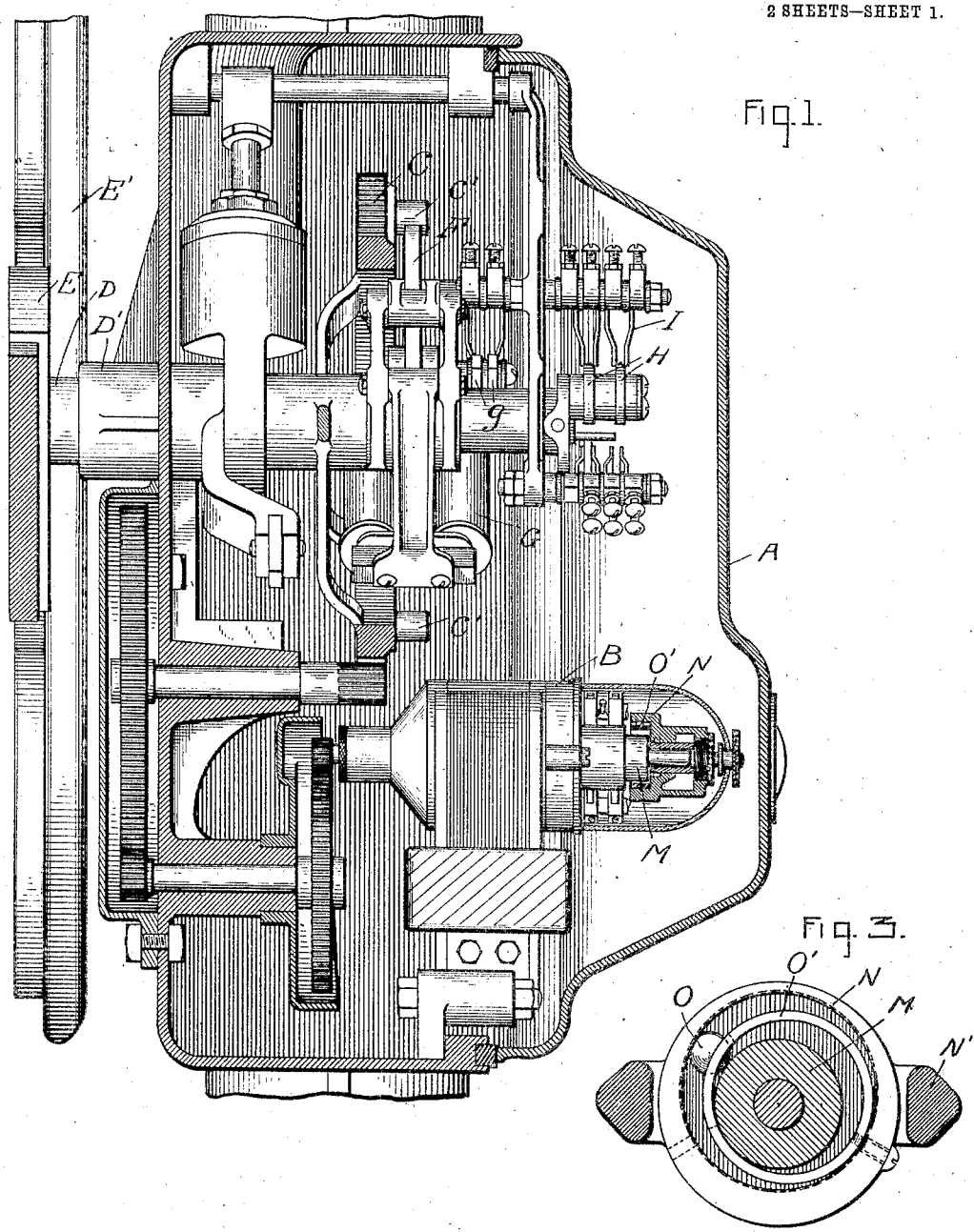

No. 868,648.  
PATENTED OCT. 22, 1907.  
F. B. COREY.  
SEMAPHORE SIGNAL.  
APPLICATION FILED MAR. 27, 1907.

2 SHEETS—SHEET 1.

WITNESSES.  
W. Ray Taylor.  
J. Ubin Glen.

INVENTOR  
FRED B. COREY.  
by  
Atty

No. 868,648. PATENTED OCT. 22, 1907.
F. B. COREY.
SEMAPHORE SIGNAL.
APPLICATION FILED MAR. 27, 1907.
2 SHEETS—SHEET 2.
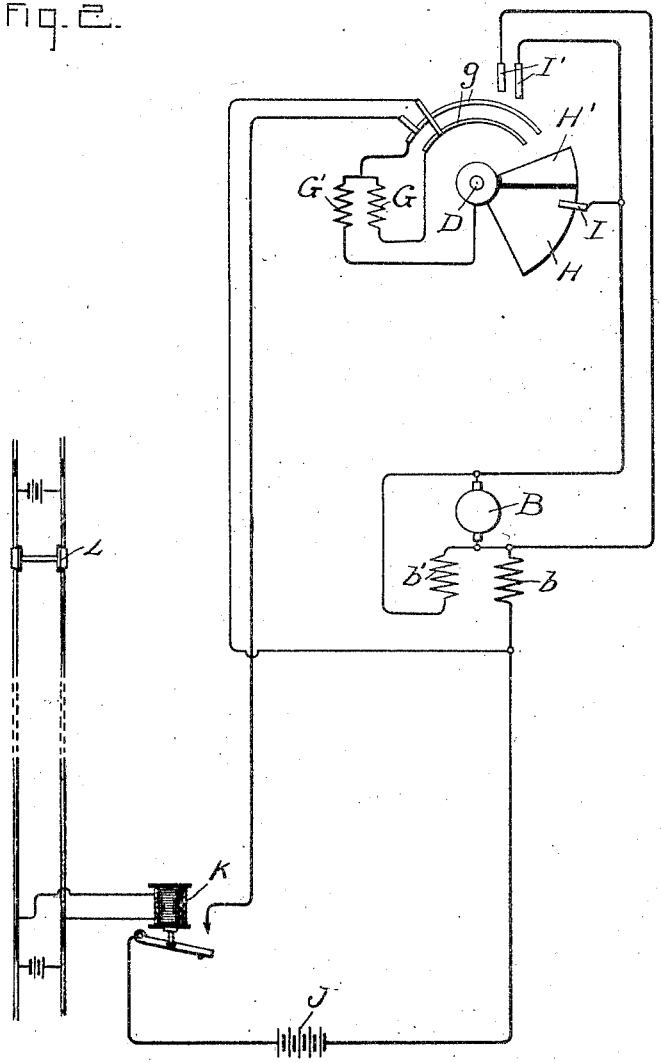
WITNESSES
INVENTOR
FRED. B. COREY.
by
Atty

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

SEMAPHORE-SIGNAL.

No. 868,648.     Specification of Letters Patent.     Patented Oct. 22, 1907.

Application filed March 27, 1907. Serial No. 364,796.

*To all whom it may concern:*

Be it known that I, FRED B. COREY, a citizen of the United States, residing at Schenectady, county of Schenectady, State of New York, have invented certain new and useful Improvements in Semaphore-Signals, of which the following is a specification.

My invention relates to semaphore signals actuated by electric motors, and its object is to provide simple and effective means for arresting the motion of the semaphore-arm when it reaches clear position and the circuit of the driving motor is opened. It is ordinarily desirable to provide means for stopping the semaphore-arm as soon as the circuit of the motor is broken, since the distance through which the inertia of the moving parts might carry the arm is indeterminate, because of variation in battery voltage, and the point at which the arm would stop would vary at different times. In order to arrest the arm at a predetermined position clutch-brakes and locking magnets of various types have been employed heretofore.

My invention consists in employing the motor itself as a brake to arrest the movement of the arm, and providing means to prevent backward rotation of the motor. I secure the braking effect by short-circuiting the motor armature when the motor is disconnected from the source of current. To increase the braking effect the motor is preferably provided with a shunt winding in addition to the main series winding.

Means for preventing backward rotation of the motor is essential, since, if locking magnets or their equivalents are not employed, it is customary to maintain the slot mechanism energized while the signal is at clear, so as to prevent it from being returned to danger position by its counter-weight, and the torque due to the counter-weight is transmitted by the slot mechanism to the driving gearing. If a worm-gear of small thread angle is employed on the motor shaft, this serves as the means for preventing the motor being driven backward by the counter-weight when the circuit of the motor is interrupted; but since a worm-gear of small thread angle is somewhat inefficient, I prefer to employ means independent of the gearing for preventing the backward rotation of the motor.

My invention will best be understood by reference to the accompanying drawings, in which Figure 1 shows a side elevation, with the casing in cross-section, of a semaphore signal arranged in accordance with my invention; Fig. 2 is a diagram of connections; and Fig. 3 shows a detail of construction.

In Fig. 1, A represents an inclosing casing in which is mounted an electric motor B. This motor is connected through suitable speed-reducing gearing to a drive-wheel C loosely mounted on the drive-shaft D, which is journaled in a boss D' in the casing, and carries the semaphore-arm E and its counter-weight E'. In order to clutch the drive-wheel C to the shaft D, the drive-wheel is provided near its periphery with studs or projections C', and on the shaft D is mounted a slot mechanism comprising a locking piece F adapted to be engaged by the studs C' and magnets G controlling the locking piece F and adapted to move it into and out of the path of the studs C'. The particular construction and arrangement of this mechanism forms no part of my invention. $g$ represents ring segments mounted on the shaft D, by means of which current is conveyed to the slot-magnets G. H represents contacts mounted on the drive-shaft D and coöperating with the stationary contacts I to control the circuit of the motor. The connections of these contacts are shown in Fig. 2. In this figure the motor-armature is represented by B, the main series field by $b$, and the auxiliary shunt field by $b'$. Since the motor is designed for operation from a battery the main field must be series-wound to prevent short-circuiting the battery at starting. The auxiliary shunt field which is provided for braking purposes is preferably connected permanently across the armature terminals. In addition to the main slot-magnet winding G, which is made of fine wire and connected in shunt to the source, as will be presently explained, a series winding G' assists the shunt winding in attracting the armature and holding it attracted while the motor is operating; the winding G acting alone to maintain the semaphore-arm clutched to the motor after it has reached clear position. Two movable contacts H and H' are shown on the shaft D. The contact H is grounded on the shaft, as is also one terminal of the series magnet winding G'. A stationary contact I coöperates with the movable contact H. The second contact H' is insulated from the shaft D and coöperates with two stationary contacts I', which serve as braking contacts. J represents a battery or other suitable source of current for the motor and slot-magnets. K represents a track-relay, which is connected in the usual manner to the rails of a block, which is shown occupied by the train L, so that the relay is deënergized. The switch-contacts are shown in the position they occupy when the signal is at danger; the direction of rotation of these contacts, while the semaphore moves from danger to clear position being counter-clockwise.

When the train L leaves the block, the relay K is energized to attract its armature, closing a circuit from the left-hand terminal of battery J through the relay-armature, contact segment $g$, series slot winding G', shaft D, contact H, contact I, motor-armature B, and series field $b$, to the right-hand terminal of the battery. The shunt-field $b'$ remains permanently connected across the armature terminals of the motor. The closing of the relay-armature also closes the circuit of the shunt-winding G, which is connected through the relay-armature directly across the terminals of the battery J. All the windings of both motor and slot-magnets are consequently energized, so that the motor starts and drives the semaphore-arm toward clear position. This continues until contact H leaves stationary contact I, thereby disconnecting the motor from the source and opening the circuit of the series winding G'. At the same time contact H' bridges contacts I', thereby directly short-circuiting the motor-armature B. Further movement of the moving parts produced by their inertia drives the motor as a short-circuited shunt generator, and consequently causes it to act as a brake to bring the moving parts to rest. In this way, the semaphore-arm is quickly stopped when the motor circuit is broken.

It will be seen from Fig. 1 that after the motor-circuit is opened, the torque of the semaphore counter-weight is transmitted through the gearing to the motor-shaft. In order to prevent the motor from being driven backward by this torque, I make use of the construction shown in Fig. 3. A member M is mounted on the motor-shaft, and a member N is supported on the motor-frame by means of suitable brackets N'. The exterior surface of the member M and the interior surface of the member N are eccentric to each other, and serve as bearing surfaces for the ball O, which is placed between these two members and held in position by a ring O', which has a central slot to receive the ball O, as indicated by the dotted lines in Fig. 3. The inner surface of the member N is also provided with a central groove, shown in Fig. 1, and in dotted lines in Fig. 3 which assists in retaining the ball in position. The direction of rotation of the motor-shaft, when driving the semaphore-arm, is clockwise, as viewed in Fig. 3; so that the ball O rolls freely on the surface of the member M. But when the motor-shaft comes to rest and starts to move in the reverse direction, due to the torque of the semaphore counter-weight, the ball O is wedged tightly between the members M and N, and effectively prevents this rotation. Thus, the motor is free to rotate in one direction, but all movement in the opposite direction is prevented.

I do not desire to limit myself to the particular construction and arrangement of parts here shown, but aim in the appended claims to cover all modifications which are within the scope of my invention.

What I claim as new and desire to secure by Letters Patent of the United States, is—

1. In a semaphore signal, a semaphore-arm arranged to return automatically to danger position, an electric motor for driving said arm toward clear position, a source of current in circuit with said motor, contacts controlled by the movement of said arm adapted to open the motor circuit and to connect said motor as a braking generator to stop the movement of said arm, and means for preventing backward rotation of said motor.

2. In a semaphore signal, a semaphore-arm arranged to return automatically to danger position, an electric motor for driving said arm toward clear position, a source of current in circuit with said motor, contacts controlled by the movement of said arm adapted to open the motor circuit and to short-circuit the motor-armature to cause it to act as a brake for said arm, and means for preventing backward rotation of said motor.

3. In a semaphore signal, a semaphore-arm arranged to return automatically to danger position, an electric motor having series and shunt field windings for driving said arm toward clear position, a source of current in circuit with said motor, and contacts adapted to open the motor circuit and to short-circuit the motor armature to cause it to act as a brake for said arm, and means for preventing backward rotation of the motor.

4. In a semaphore signal, a semaphore-arm arranged to return automatically to danger position, an electric motor for driving said arm toward clear position, having a main series field winding and an auxiliary shunt winding permanently connected across the armature terminals, a source of current in circuit with said motor, contacts adapted to open the motor circuit and to short-circuit the motor-armature to cause it to act as a brake for said arm, and means for preventing backward rotation of the motor.

5. In a semaphore signal, a semaphore-arm arranged to return automatically to danger position, an electric motor, a source of current in circuit with said motor, a track relay having its armature included in said circuit, a slot mechanism for clutching the motor to the semaphore-arm including a magnet winding connected directly across said source in series with the relay armature, contacts included in the motor circuit controlled by the movement of said arm and adapted to open the motor circuit and to connect the motor as a braking generator, and means for preventing backward rotation of the motor.

6. In a semaphore signal, a semaphore-arm arranged to return automatically to danger position, an electric motor, a source of current in circuit with said motor, a track relay having its armature included in said circuit, a slot mechanism for clutching the motor to the semaphore-arm including a magnet winding connected directly across said source in series with the relay armature, contacts included in the motor circuit controlled by the movement of said arm and adapted to open the motor circuit and to short-circuit the motor armature, and means for preventing backward rotation of the motor.

7. In a semaphore signal, a semaphore-arm adapted to return automatically to danger position, an electric motor for driving said arm toward clear position, gearing between the motor and said arm adapted to transmit torque from either to the other, a slot mechanism for clutching said motor to said arm, and means for preventing backward rotation of said motor comprising two members having respectively external and internal bearing surfaces eccentric to each other, one stationary and the other carried by the motor armature, and a rolling member disposed between said bearing surfaces.

8. In a semaphore signal, a semaphore-arm arranged to return automatically to danger position, an electric motor for driving said arm toward clear position, gearing between said motor and said arm, adapted to transmit torque from either to the other, a source of current in circuit with said motor, contacts controlled by the movement of said arm adapted to open the motor circuit and to connect said motor as a braking generator to stop the movement of said arm, and means for preventing the backward rotation of said motor.

9. In a semaphore signal, a semaphore-arm arranged to return automatically to danger position, an electric motor for driving said arm toward clear position, gearing between said motor and said arm adapted to transmit torque from either to the other, a source of current in circuit with said motor, contacts controlled by the movement of said arm adapted to open the motor circuit and to short-circuit the motor armature to cause it to act as a brake for said arm, and means for preventing the backward rotation of said motor.

In witness whereof I have hereunto set my hand this 25th day of March, 1907.

FRED B. COREY.

Witnesses:
BENJAMIN B. HULL.
HELEN ORFORD.